United States Patent
Nakano et al.

(10) Patent No.: US 6,800,840 B2
(45) Date of Patent: Oct. 5, 2004

(54) PORTABLE INFORMATION PROCESSOR

(75) Inventors: Masayoshi Nakano, Machida (JP); Tetsuji Nakamura, Yokohama (JP); Takashi Yanagisawa, Kanagawa-ken (JP); Fusanobu Nakamura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 09/950,995

(22) Filed: Sep. 11, 2001

(65) Prior Publication Data

US 2002/0030816 A1 Mar. 14, 2002

(30) Foreign Application Priority Data

Sep. 11, 2000 (JP) .......................................... 2000-275429

(51) Int. Cl.[7] ................................................. H01J 40/14
(52) U.S. Cl. ........................ 250/221; 361/174; 361/683
(58) Field of Search ................................. 361/173–175, 361/680–681, 683; 307/117; 250/221, 222.1, 559.26, 559.3, 559.4; 356/399–400; 340/555–557

(56) References Cited

U.S. PATENT DOCUMENTS

| | | | | |
|---|---|---|---|---|
| 3,806,739 A | * | 4/1974 | Irie et al. ..................... | 327/461 |
| 5,214,293 A | * | 5/1993 | MacNiel ................ | 250/559.29 |
| 6,122,152 A | * | 9/2000 | Goto et al. ..................... | 361/1 |
| 6,301,098 B1 | * | 10/2001 | Kim ............................. | 361/680 |
| 6,396,072 B1 | * | 5/2002 | Meyhofer et al. ....... | 250/559.4 |
| 6,421,235 B2 | * | 7/2002 | Ditzik ......................... | 361/683 |
| 6,534,761 B2 | * | 3/2003 | Fukatsu et al. .......... | 250/222.1 |

FOREIGN PATENT DOCUMENTS

JP           406148344 A  *  5/1994  ................. 250/221

* cited by examiner

Primary Examiner—Stephone B. Allen
Assistant Examiner—Patrick J. Lee
(74) Attorney, Agent, or Firm—Carlos Munoz-Bustamante

(57) ABSTRACT

A portable information processor includes a computer main body and a digitizer connected by a flexible hinge defined in a cover. The hinge allows the computer main body and the digitizer to assume different superposed states by means of a flexible separable portion of the cover. In the superposed state of the computer main body and the digitizer, arbitrariness in folding back the separable portion causes runout between the computer main body and the digitizer. In spite of this runout, the superposed state can be accurately detected by means of an optical sensor, including an infrared radiator and an infrared-ray detector, disposed in the computer main body. A flexible reflection member is fixed to a predetermined surface of the separable portion of the leather cover, while assuring a predetermined area. If the computer main body and the digitizer assume a superposed state, light emitted from the infrared radiator is reflected by the flexible reflection member and is incident on the infrared-ray detector.

13 Claims, 9 Drawing Sheets

PORTABLE INFORMATION PROCESSOR

FIELD OF THE INVENTION

The present invention relates to portable information processors such as portable computers, etc., and more particularly to a portable information processor including a flexible hinge.

BACKGROUND OF THE INVENTION

Portable computer devices equipped with a digitizer, e.g. PDAs, are becoming more prevalent and it is generally desirable that they be made as compact as possible, while assuring user friendliness during use.

SUMMARY OF THE INVENTION

Based on their knowledge of such devices, the inventors are aware of one type of portable computer including a digitizer in which, the liquid crystal display is disposed in the computer main body thickness portion and the digitizer is disposed in the digitizer thickness portion. The computer main body thickness portion and the digitizer thickness portion are interconnected by a leather cover which also functions as a flexible hinge. The deformation of flexion of the leather cover is utilized so that the computer main body thickness portion and the digitizer thickness portion can be opened with each other and superposed with each other in a wide variety of superposed states.

In the portable computer mentioned above, during use of the digitizer, the digitizer is disposed with its upper surface upward and its lower surface placed on the liquid crystal display, while the liquid crystal display is covered with the digitizer. If power to the liquid crystal display is not shut off in the case where the digitizer is placed on the liquid crystal display being in a non-operative state, wasteful power will be consumed and heat generated will stay in the liquid crystal display. Therefore, when the lower surface of the digitizer is placed on the liquid crystal display, it is desirable that power to the back light of the liquid crystal display be switched off. In addition, in the case where the liquid crystal display is also used as a touch panel, there is a possibility that the pressure of the pen on the digitizer will be transmitted to the touch panel under the digitizer and therefore the touch panel will be operated in error. From the standpoint of preventing this erroneous operation, it is also necessary to switch off power to the touch panel or invalidate inputs to the touch panel during the time that the digitizer is placed on the liquid crystal display.

To detect a superposed state in which the digitizer is superposed on the liquid crystal display, a predetermined sensor, for detecting that the digitizer is positioned over the liquid crystal display, is required. However, because of arbitrariness in folding back or bending the leather cover, the relative position in the superposed-surface direction between the digitizer and the liquid crystal display is not always the same and therefore runout will be caused therebetween. Therefore, in the case of detecting the superposed state of the digitizer and the liquid crystal display by the use of sensors fixed at predetermined positions on the digitizer and the liquid crystal display, there are cases where the superposed state cannot be accurately detected, depending on variations in the relative position in the superposed-surface direction between the digitizer and the liquid crystal display.

The primary object of the present invention, in a portable information processor including first and second stacked portions, interconnected by a deformable member, which can be superposed in stacked form with each other, is to accurately detect the superposed state of the first and second stacked portions in spite of runout in the superposed-surface direction between the first and second stacked portions.

A portable information processor according to a first aspect comprises: first and second stacked portions which can be superposed in stacked form relative to each other; a deformable member connecting the first and second stacked portions, while allowing the first and second stacked portions to be superposed and to be separated in a predetermined range by deforming; a radiation-emitting device and a photodetector provided in one of the first and second stacked portions; a radiation reflection member, provided in either the other stacked portion or the deformable member, for reflecting radiation emitted from the radiation-emitting device, toward the photodetector when the first and second stacked portions go to a predetermined superposed state; and a processing unit for judging, based on incidence of the emitted radiation on the photodetector, whether or not the first and second stacked portions are in the superposed state, and carrying out a predetermined process when judging the first and second stacked portions to be in the superposed state.

The term 'portable information processor' includes at least portable computers and personal digital assistants (PDAs) and the like. The aforementioned radiation includes visible light, infrared rays as non-visible light, and microwaves. The deformable member includes every possible member which is deformable, such as an elastic deformable member, a plastically-deformable member, and a flexible member. The deformable member preferably is in the form of a sheet. The flexible member includes a leather member, a cloth member, a fabric member, and a synthetic resin member.

The superposed state of the first and second stacked portions is detected by detecting the incidence of the emitted light of the light-emitting device on the photodetector. Therefore, if the light reflection member has an appropriate area, the emitted light from the light-emitting device is properly incident on the photodetector, even if there is runout in the superposed-surface direction between the first and second stacked portions in the superposed state. Therefore, even if arbitrariness in deformation of the deformable member causes the runout in the superposed-surface direction between the first and second stacked portions in the superposed state, the superposed state of the first and second stacked portions can be accurately detected.

According to the portable information processor of a second aspect, in the portable information processor of the first aspect, each side of the first stacked portion is defined as an upper surface and lower surface, respectively, and the superposed state of the first and second stacked portions includes a first superposed state, in which an upper surface of the first stacked portion is directed to a side opposite from the second stacked portion, and a second superposed state, in which a lower surface of the first stacked portion is directed to a side opposite from the second stacked portion. The deformable member allows both the first and second superposed states by deformation thereof and is connected at its lower surface to the first stacked portion. In the first superposed state, the deformable member is present between the first and second stacked portions. The light reflection member is provided in the deformable member, and the light-emitting device and the photodetector are disposed in the second stacked portion.

When the user uses the first stacked portion, the first stacked portion is superposed on the second stacked portion with its upper surface directed outward, that is, to a side opposite from the second stacked portion. According to the second aspect, the superposed state in which the first stacked portion is superposed on the second stacked portion with its front surface directed outward can be detected.

According to the portable information processor of a third aspect, in the portable information processor of the second aspect the deformable member is constructed of a flexible member which is deformable by flexion thereof.

The flexion of the flexible member includes folding and bending.

According to the portable information processor of a fourth aspect, in the portable information processor of the third aspect the light reflection member is constructed of a flexible light reflection member rigidly attached to the flexible member.

The flexible light reflection member preferably is constructed of a thin aluminum sheet covered with vinyl. In that case the vinyl fulfills a role of protecting the aluminum sheet which is the light reflection surface.

According to the portable information processor of a fifth aspect, in the portable information processor of the third aspect the flexible member is also used as the light reflection member.

As the flexible member itself is the light reflection member, addition of the light reflection member can be omitted.

According to the portable information processor of a sixth aspect, in the portable information processor of the first aspect the light-emitting device generates light which has a predetermined blinking pattern. Whether or not light incident on the photodetector is light emitted from the light-emitting device is judged by judgement of whether a blinking pattern of the incident light on the photodetector coincides with the predetermined blinking pattern.

There are cases where external light other than the light emitted from the light-emitting device is also incident on the photodetector and results in erroneous detection. For this reason, the light from the light-emitting device is generated in a predetermined blinking pattern. When the photodetector receives the predetermined blinking pattern, it is judged that the first and second stacked portions are in a superposed state. In this manner, erroneous detection due to external light can be prevented.

According to the portable information processor of a seventh aspect, in the portable information processor of the first aspect a distance from the light reflection member to the photodetector, on which judgement of the superposed state is based, is varied by varying emission intensity of the light-emitting device, sensitivity of the photodetector, and/or a reflection coefficient of the light reflection member.

If the emission intensity of the light-emitting device, the sensitivity of the photodetector, or the reflection coefficient of the light reflection member is increased, the distance from the first stacked portion to the second stacked portion at the time of judgement of the superposed state, can be increased.

According to the portable information processor of an eighth aspect, in the portable information processors of the second through the fourth aspects the first stacked portion is a digitizer.

According to the portable information processor of a ninth aspect, in the portable information processor of the eighth aspect the second stacked portion is a liquid crystal display with a back light. In the superposed state of the first and second stacked portions where the processing unit performs the predetermined process, the lower surface of the digitizer is superposed on the upper surface of the liquid crystal display with a back light. The processing unit turns off the back light when judging the first and second stacked portion to be in a superposed state.

In the operative state of the digitizer, the digitizer directs its input side, i.e., its upper surface to a side opposite from the liquid crystal display having a back light, while placing its lower surface on the liquid crystal display with a back light. In this state, switching off the back light of the liquid crystal display with a back light can make a contribution to saving energy and also prevent heat from staying in the liquid crystal display with a back light.

According to the portable information processor of a tenth aspect, in the portable information processor of the ninth aspect the second stacked portion is a touch panel. In the superposed state of the first and second stacked portions where the processing unit performs the predetermined process, the lower surface of the digitizer is superposed on the upper surface of the touch panel. The processing unit causes the touch panel to be in a non-operative state when judging the first and second stacked portion to be in a superposed state.

In the operative state of the digitizer, the digitizer is placed on the touch panel. For this reason, there are cases where the pressure of a writing tool to the digitizer is transmitted to the touch panel and causes an erroneous input to the touch panel. When the photodetector detects that the first stacked portion is in the second superposed state, the touch panel is caused to be in a non-operative state, whereby an erroneous input to the touch panel is prevented.

The portable information processor of an eleventh aspect comprises:

- first and second stacked portions which can be superposed in stacked form with each other;
- a deformable member connecting the first and second stacked portions, while allowing the first and second stacked portions to be superposed and to be separated in a predetermined range by deforming;
- a supersonic wave transmitter provided in one of the first and second stacked portions;
- a supersonic wave receiver, provided in one of the first and second stacked portions, for receiving supersonic waves, transmitted from the supersonic wave transmitter, and reflected by the other stacked portion or deformable member, when the first and second stacked portions go to a superposed state; and
- a processing unit for judging, based on the reception of the supersonic waves from the supersonic wave transmitter to the supersonic wave receiver, whether or not the first and second stacked portions are in the superposed state, and carrying out a predetermined process when judging the first and second stacked portions to be in the superposed state.

Instead of light, the superposed state of the first and second stacked portions can be accurately detected by supersonic waves, in spite of runout in the superposed state. Because supersonic waves are reflected by the other of the first and second stacked portions, or by the deformable member, addition of the reflection member provided in the case of light can be omitted. The second, the third and the sixth through the tenth aspects (where the construction other than the light reflection means is limited) in the case of detecting the superposed state of the first and second stacked portions by the use of light, as they are, can be applied to the eleventh aspect employing supersonic waves. The reflection member provided in the case of light may be added to the eleventh aspect.

The portable information processor of a twelfth aspect comprises:

first and second stacked portions which can be superposed in stacked form with each other;

a deformable member connecting the first and second stacked portions, while allowing the first and second stacked portions to be superposed and to be separated in a predetermined range by deforming;

a light-emitting device provided in one of the first and second stacked portions;

a photodetector, provided in either the other stacked portion or the deformable member, for receiving light emitted from the light-emitting device, when the first and second stacked portions go to a predetermined superposed state; and a processing unit for judging, based on the light received by the photodetector, whether or not the first and second stacked portions are in the superposed state, and carrying out a predetermined process when judging the first and second stacked portions to be in the superposed state.

While, in the aforementioned first aspect, the light-emitting device and the photodetector are provided in one of the first and second stacked portions, the twelfth aspect provides the light-emitting device and the photodetector in opposition to each other, thereby omitting the light reflection member.

A preferred embodiment of the present invention will hereinafter be described with reference to the accompanying drawings.

DETAILED DESCRIPTION OF THE PREFERRED EMBODIMENT

Figure 1:
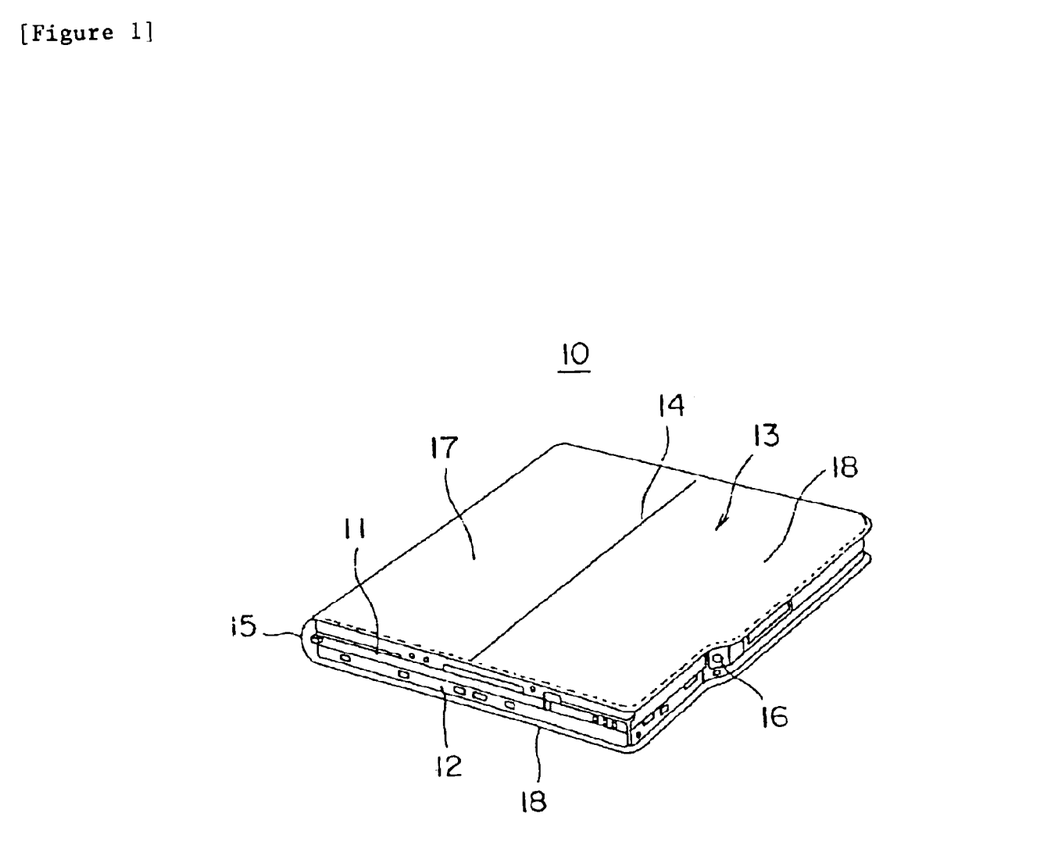
FIG. 1 is a perspective view showing a portable computer in a closed state.

FIG. 1 shows a perspective view of a portable computer 10 in a state suitable for carrying. The portable computer 10 has a computer main body thickness portion 11 and a digitizer thickness portion 12 superposed with respect to each other in the thickness direction. If the portable computer 10 in the state shown in FIG. 1 is compared to a book, the leather cover 13 covers a superposed object of the computer main body thickness portion 11 and the digitizer thickness portion 12 (hereinafter referred to, as appropriate, as a "superposed object X") so that it constitutes the upper, lower, and back covers of the book. At the back portion 15, the leather cover 13 covers one of the four thickness surfaces of the superposed object X (hereinafter referred to, as appropriate, as a "back thickness surface B1"). In a range corresponding to the upper and lower cover surfaces, the leather cover 13 is divided at a fold line 14 into approximately two parts, a separable portion 17 near to the back portion 15 and a rigidly-attached portion 18 away from the back portion 15. The leather cover 13 is separable at the back portion 15 and the separable portion 17 as appropriate, with respect to the superposed object X, and is always attached rigidly at the rigidly-attached portion 18. Thus, the leather cover 13 fulfills the role of a flexible hinge which connects the computer main body thickness portion 11 and the digitizer thickness portion 12 so that they can be closed or opened. A latch 16 is provided on the thickness surface of the superposed object X opposite from the back thickness surface B1 (hereinafter referred to, as appropriate, as a "belly thickness surface B2"). If the latch 16 is slid, the computer main body thickness portion 11 and the digitizer thickness portion 12 can be locked or unlocked at the belly thickness surface B2 of the superposed object X.

Figure 2:
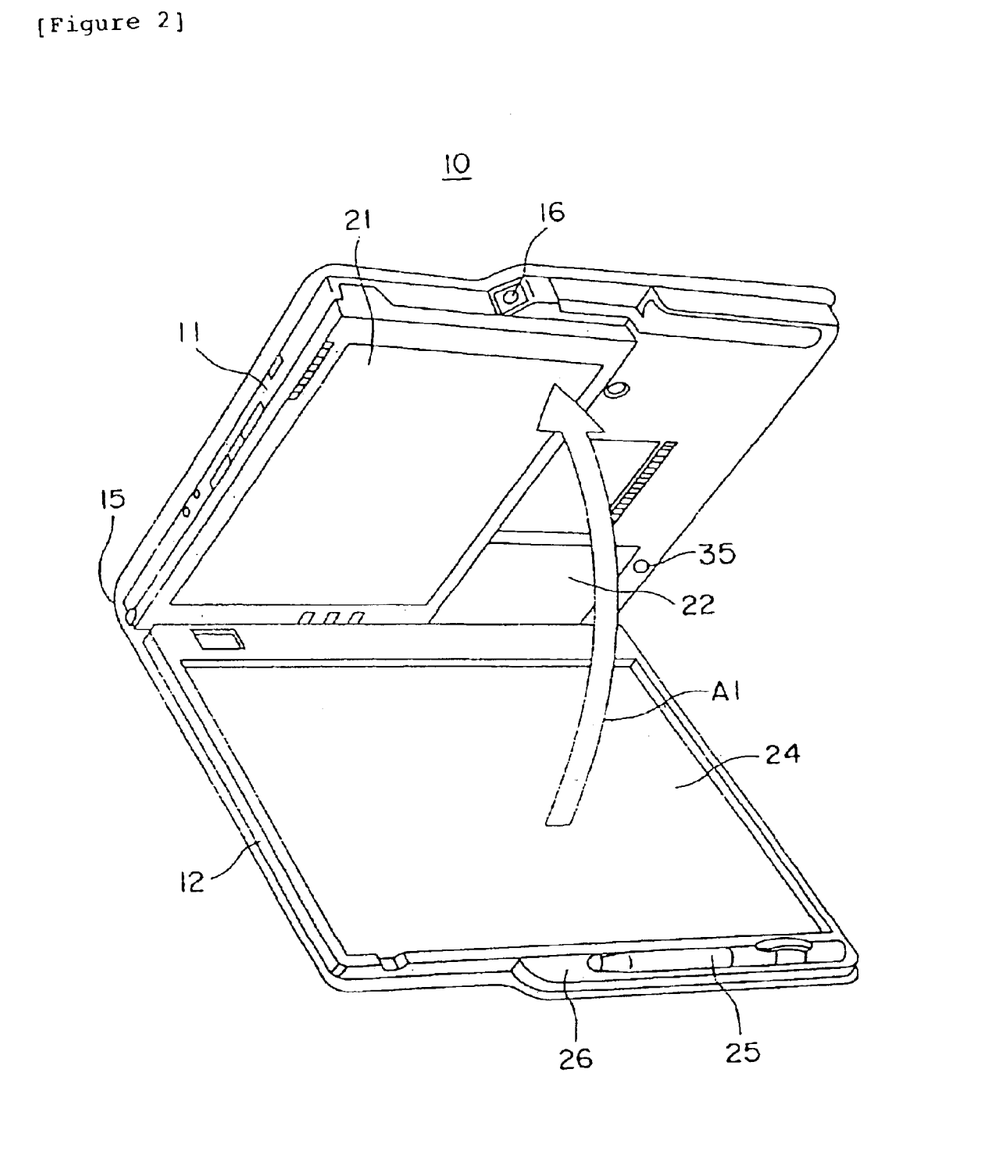
FIG. 2 is a perspective view showing the portable computer opened a predetermined angle from the state shown in FIG. 1.

FIG. 2 illustrates the portable computer 10 opened a predetermined angle from the state shown in FIG. 1. In the portable computer 10 shown in FIG. 1, the latch 16 is pushed to release the computer main body thickness portion 11 and the digitizer thickness portion 12, locked at the belly thickness surface B2. Then, if the computer main body thickness portion 11 is opened in the direction of arrow A1 with respect to the digitizer thickness portion 12, just as a book is opened, the liquid crystal display 21 appears on the side of the computer main body thickness portion 11 opposite to the digitizer thickness portion 12, and the digitizer 24 appears on the side of the digitizer thickness portion 12 opposite to the computer main body thickness portion 11. That is, it is found that in the superposed state of the computer main body thickness portion 11 and the digitizer thickness portion 12 shown in FIG. 1 (hereinafter referred to, as appropriate, as the "first superposed state C1"), the liquid crystal display 21 and the digitizer 24 are superposed in opposition to each other. On the side of the computer main body thickness portion 11, the liquid crystal display 21 occupies more than one-half the area of the computer main body thickness portion 11, and on the remaining portion, a battery 22 is detachably installed. On the side of the digitizer thickness portion 12, in addition to the digitizer 24, a protruding portion 26 protrudes from the frame portion of the digitizer 24, and an input pen 25 is received in a recess formed in the protruding portion 26. Note that the digitizer 24 is also called a "tablet".

Figure 3:
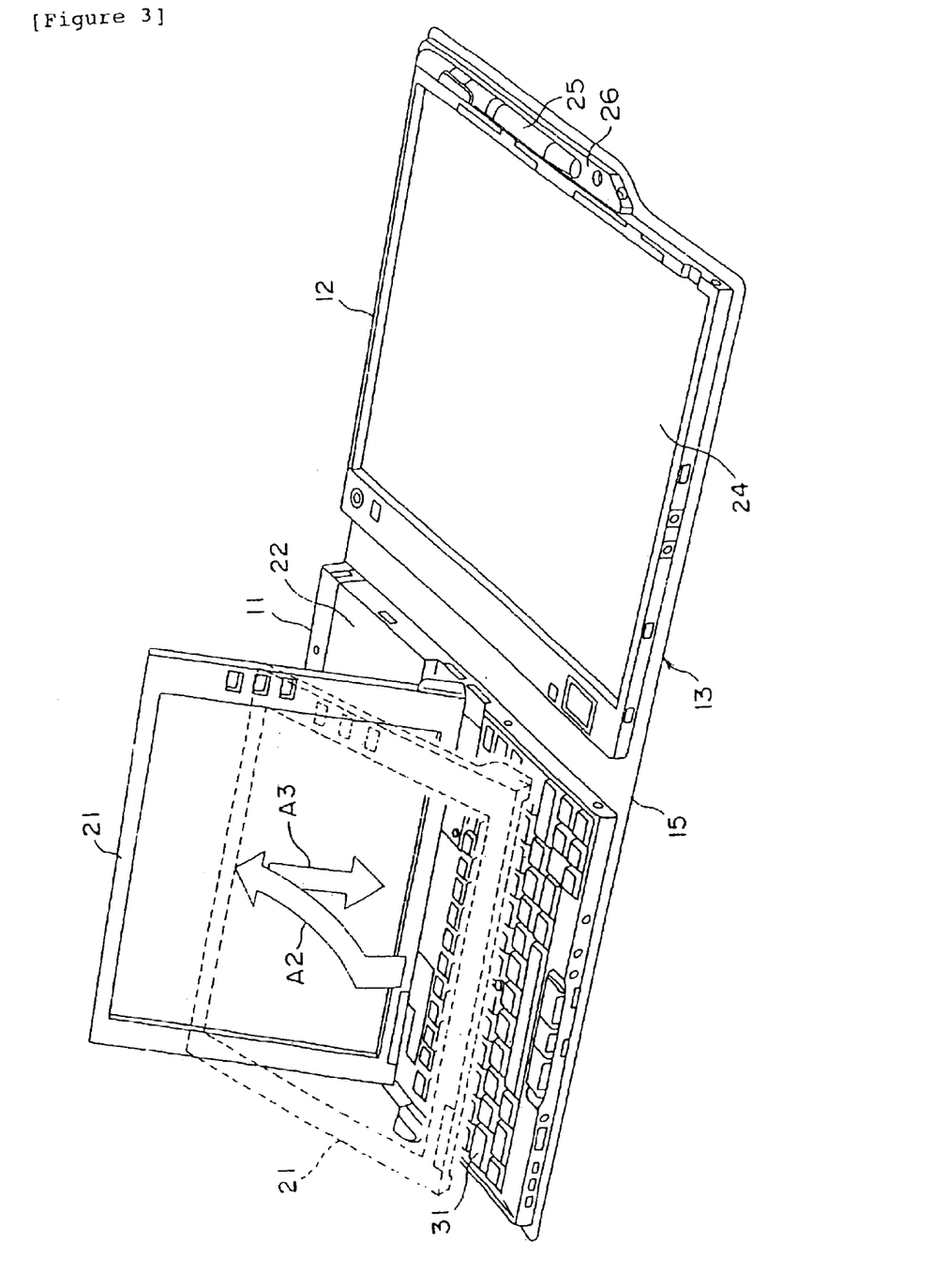
FIG. 3 is a perspective view showing the portable computer opened 180° from the state shown in FIG. 1.

FIG. 3 illustrates the portable computer 10 opened 180° from the state shown in FIG. 1. On the side of the computer main body thickness portion 11, the liquid crystal display 21 is joined to the rear end of a keyboard 31 through a folding stand (not shown). The upper edge of the liquid crystal display 21 is moved upward in an oblique direction (of arrow A2) and then the lower edge of the liquid crystal display 21 is lowered to the rear end of the keyboard 31 (in the direction of arrow A3), whereby the keyboard 31 under the liquid crystal display 21 is exposed and the liquid crystal display 21 is stood up at the rear end of the keyboard 31. In this manner, it becomes possible for the user to perform an input operation through the keyboard 31, while viewing the screen of the liquid crystal display 21.

Figure 4:
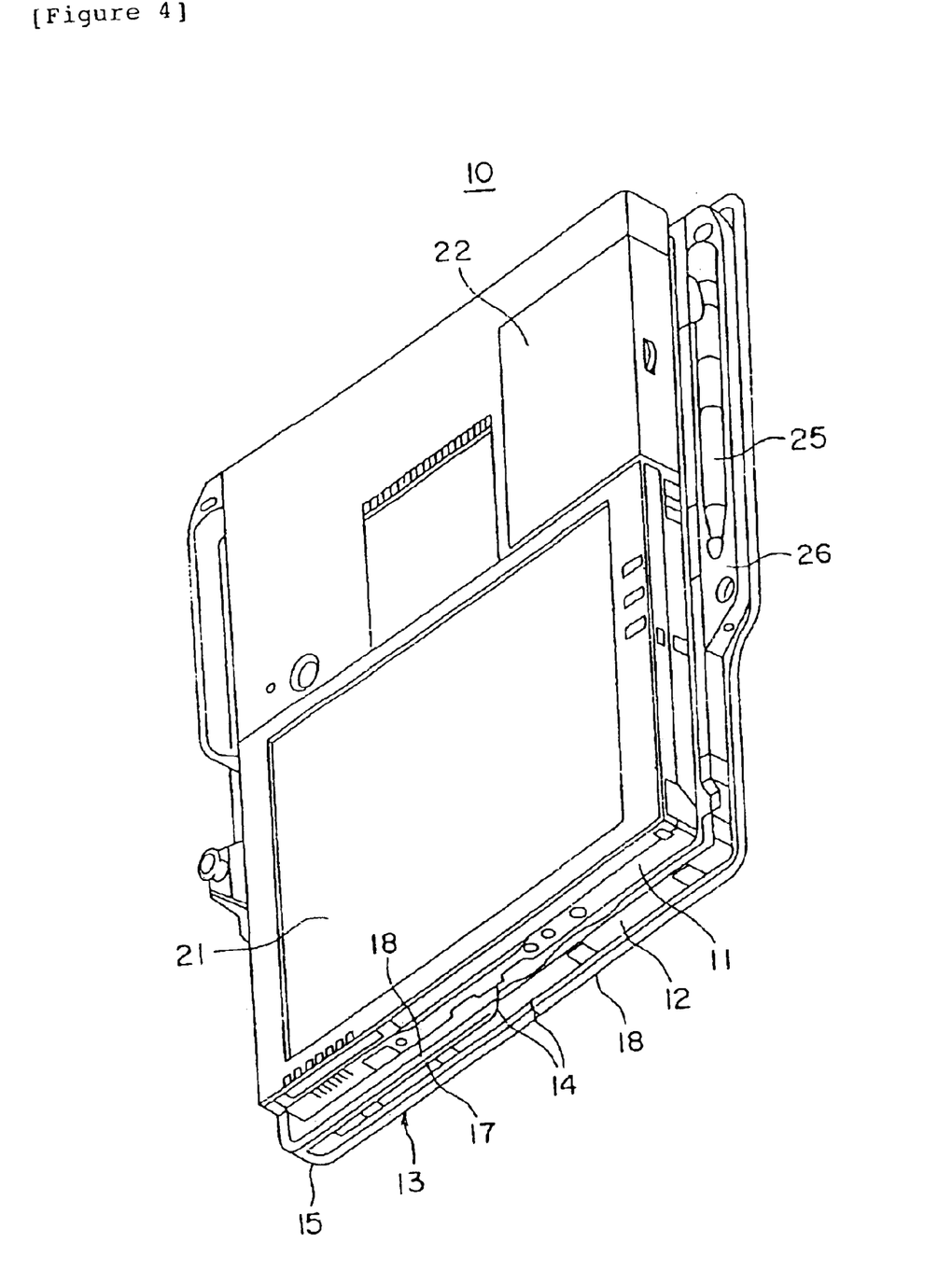
FIG. 4 is a perspective view showing the liquid crystal display of the portable computer as used in a space-saving state.

FIG. 4 illustrates the liquid crystal display 21 as used in a space-saving state. In FIG. 4 there is shown the liquid crystal display 21 before it is stood up. When actually using it, the liquid crystal display 21 has to be stood up and the keyboard 31 under the liquid crystal display 21 exposed, as shown in FIG. 3. The superposed state shown in FIG. 4 (hereinafter referred to, as appropriate, as the "second superposed state C2") differs from the first superposed state C1 mentioned above, although the computer main body thickness portion 11 and the digitizer thickness portion 12 are in a superposed state. That is, in the second superposed state C2, the liquid crystal display 21 and the digitizer 24 are disposed with the upper surfaces upward, and the computer main body thickness portion 11 is superposed on the digitizer thickness portion 12. To achieve the second superposed state C2, the separable portion 17 covering the lower surface of the computer main body thickness portion 11 (the opposite surface of the computer main body thickness portion 11 from the surface of the liquid crystal display 21 being in a stored state) in the first superposed state C1, in the second superposed state C2, is folded back under the rigidly-attached portion 18 on the lower surface side of the computer main body thickness portion 11. The separable portion 17 covering the lower surface of the digitizer 24 in the first superposed state C1, in the second superposed state C2, is also at the position where it covers the lower surface of the digitizer 24. The protruding portion 26 has recesses on the sides of the computer main body thickness portion 11 and the digitizer thickness portion 12 so that the input pen 25 can be placed in both recesses. In FIG. 4, the input pen 25 is placed in the recess of the protruding portion 26 being on the side of the computer main body thickness portion 11. Since the liquid crystal display 21 is also used as a touch panel, the user is able to execute a predetermined input operation by touching the tip end of the input pen 25 with the screen of the liquid crystal panel 21 with a predetermined pressure.

Figure 5:
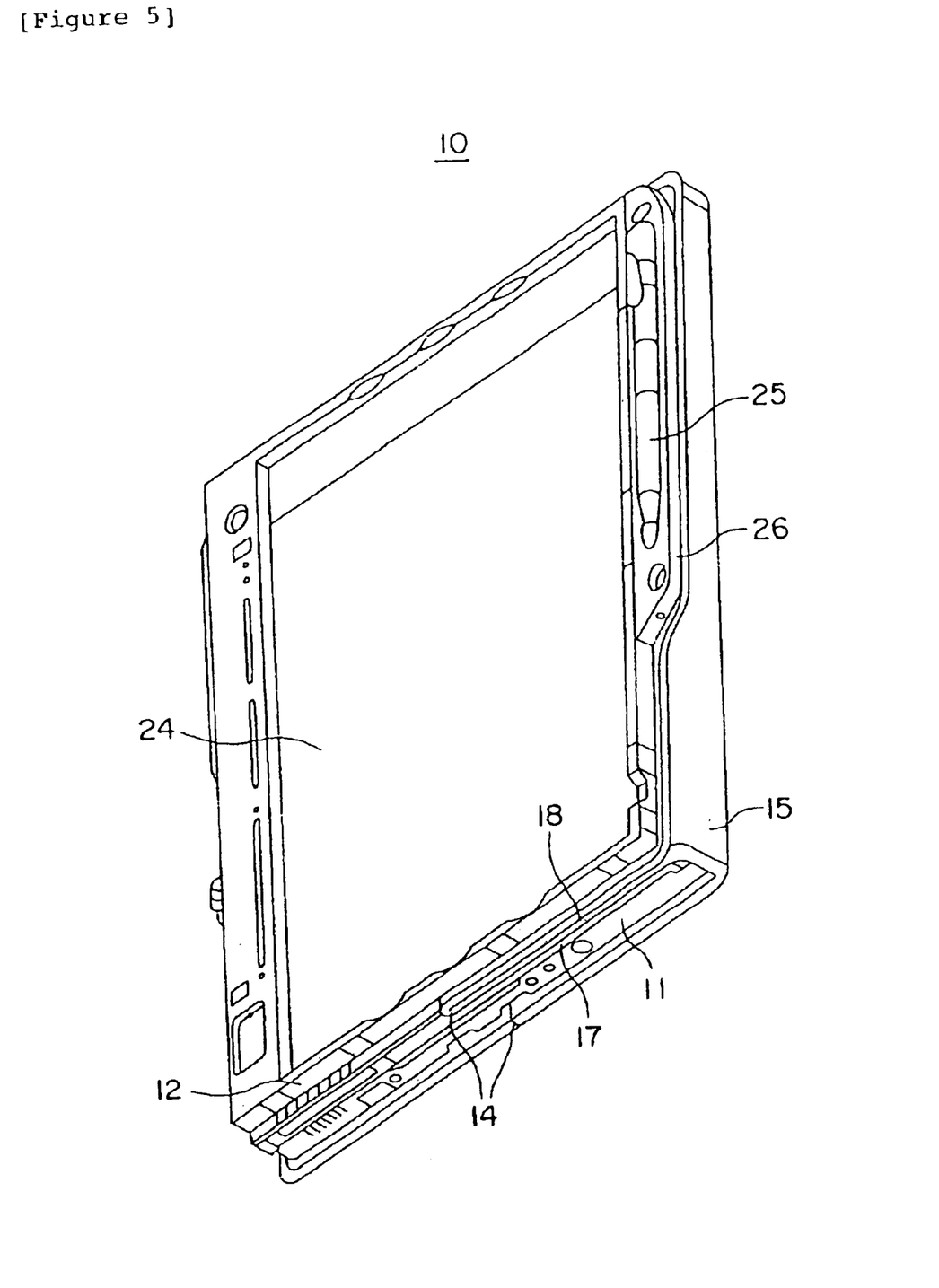
FIG. 5 is a perspective view showing the digitizer of the portable computer as used in a space-saving state.

FIG. 5 illustrates the digitizer 24 as used in a space-saving state. The superposed state shown in FIG. 5 (hereinafter referred to, as appropriate, as the "third superposed state C3") is different from the first and second superposed states C1 and C2 mentioned above, although the computer main body thickness portion 11 and the digitizer thickness portion 12 are in a superposed state. That is, in the third superposed state C3, the liquid crystal display 21 and the digitizer 24 are disposed with the upper surfaces upward, and the digitizer thickness portion 12 is superposed on the computer main body thickness portion 11. To achieve the third superposed state C3, the separable portion 17 covering the lower surface of the digitizer 24 in the first superposed state C1, in the third superposed state C3, is folded back under the rigidly-attached portion 18 on the lower surface side of the digitizer 24. The separable portion 17 covering the lower surface of computer main body thickness portion 11 in the first superposed state C1, in the third superposed state C3, is also at the position where it covers the lower surface of the computer main body thickness portion 11. The input pen 25 outputs a predetermined electromagnetic wave from its tip end, as an input pen for the digitizer 24 and is also used as a ball pen. When inputting a diagram, etc., through the digitizer 24, the user places paper on the digitizer 24 and moves the tip end of the input pen 25 on the paper. The diagram drawn by the user is described on the paper, and the digitizer 24 receives the electromagnetic wave input from the tip end of the input pen 25, through the paper. As a result, the diagram on the paper is stored as data in the memory of the personal computer.

Figure 6:
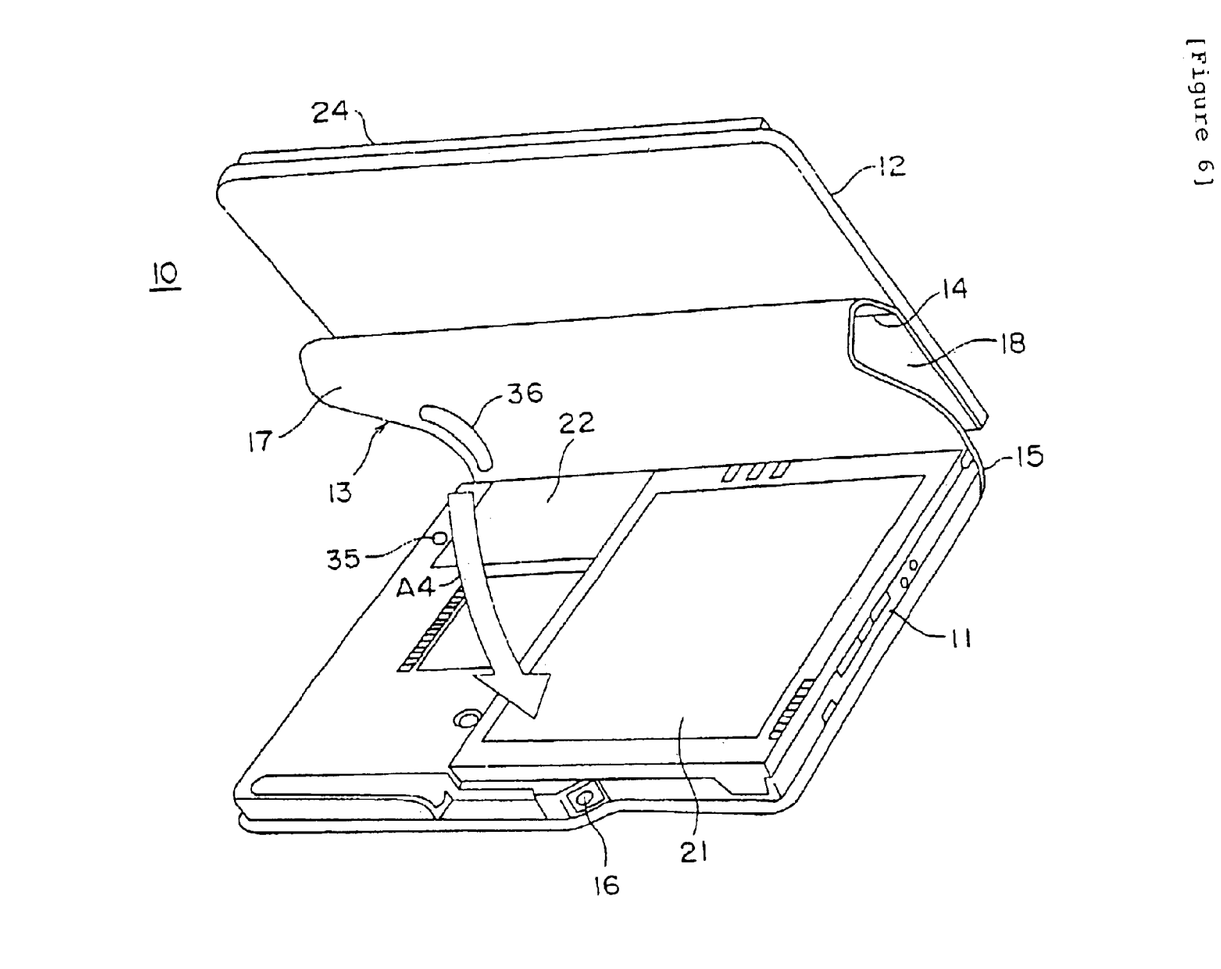
FIG. 6 is a perspective view showing the portable computer being changed from the first superposed state C1 (FIG. 1) to the third superposed state C3 (FIG. 5)

FIG. 6 shows the portable computer 10 being changed from the first superposed state C1 (FIG. 1) to the third superposed state C3 (FIG. 5). The digitizer thickness portion 12 is being lowered in the direction of arrow A4. On the upper surface of the computer main body thickness portion 11 (which is the surface of the computer main body thickness portion 11 on the same side as the surface of the liquid crystal display 21 being in a stored state), an optical sensor 35 is disposed at a position, on the edge portion away from the liquid crystal display 21, and a little away from the back portion 15. While the rigidly-attached portion 18 of the leather cover 13 is rigidly attached to the lower surface of the digitizer thickness portion 12 (which is the opposite surface of the digitizer 24 from the input surface), the separable portion 17 is separated from the lower surface of the digitizer thickness portion 12. The digitizer thickness portion 12 is disposed with the digitizer 24 upward, so that the lower surface is placed on the computer main body thickness portion 11. When this occurs, the separable portion 17 exposes its surface, attached in the first superposed state C1 to the digitizer thickness portion 12. This surface will hereinafter be referred to, as appropriate, as a "first surface". A flexible reflection member 36 is constructed of a thin aluminum sheet covered with vinyl, and is short in the direction where the fold line 14 extends and long in the direction perpendicular to the extending direction of the fold line 14. In the third superposed state C3, the flexible reflection member 36 is stuck to the first surface of the separable portion 17 at the position where it can cover the optical sensor 35. The flexible reflection member 36 has flexibility along with the separable portion 17, and the separable portion 17 keeps sufficient flexibility in spite of the sticking of the flexible reflection member 36. Because of arbitrariness in folding back the separable portion 17, even in the third superposed state C3, the relative position between the computer main body thickness portion 11 and the digitizer thickness portion 12 is not always the same and therefore runout will be caused therebetween. In spite of this runout, if the digitizer thickness portion 12 is moved close to the computer main body thickness portion 11, the flexible reflection member 36 is positioned over the optical sensor 35 and reflects light emitted from an infrared radiator 40 to be described, toward an infrared-ray detector 41.

In FIG. 6 the optical sensor 35 is provided at a position on the computer main body thickness portion 11 which is relatively closer to the back thickness surface B1. However, in the case where the optical sensor 35 is provided at a position near the belly thickness surface B2 (i.e., a position on the computer main body thickness portion 11, not covered in the third superposed state C3 by the separable portion 17, and directly covered by the lower surface of the digitizer thickness portion 12), the flexible reflection member 36 is rigidly attached to the lower surface of the digitizer thickness portion 12, not the separable portion 17. In addition, the optical sensor 35 can be disposed on the lower surface side of the digitizer thickness portion 12, and the flexible reflection member 36 can be provided on the upper surface side of the computer main body thickness portion 11.

Figure 7:
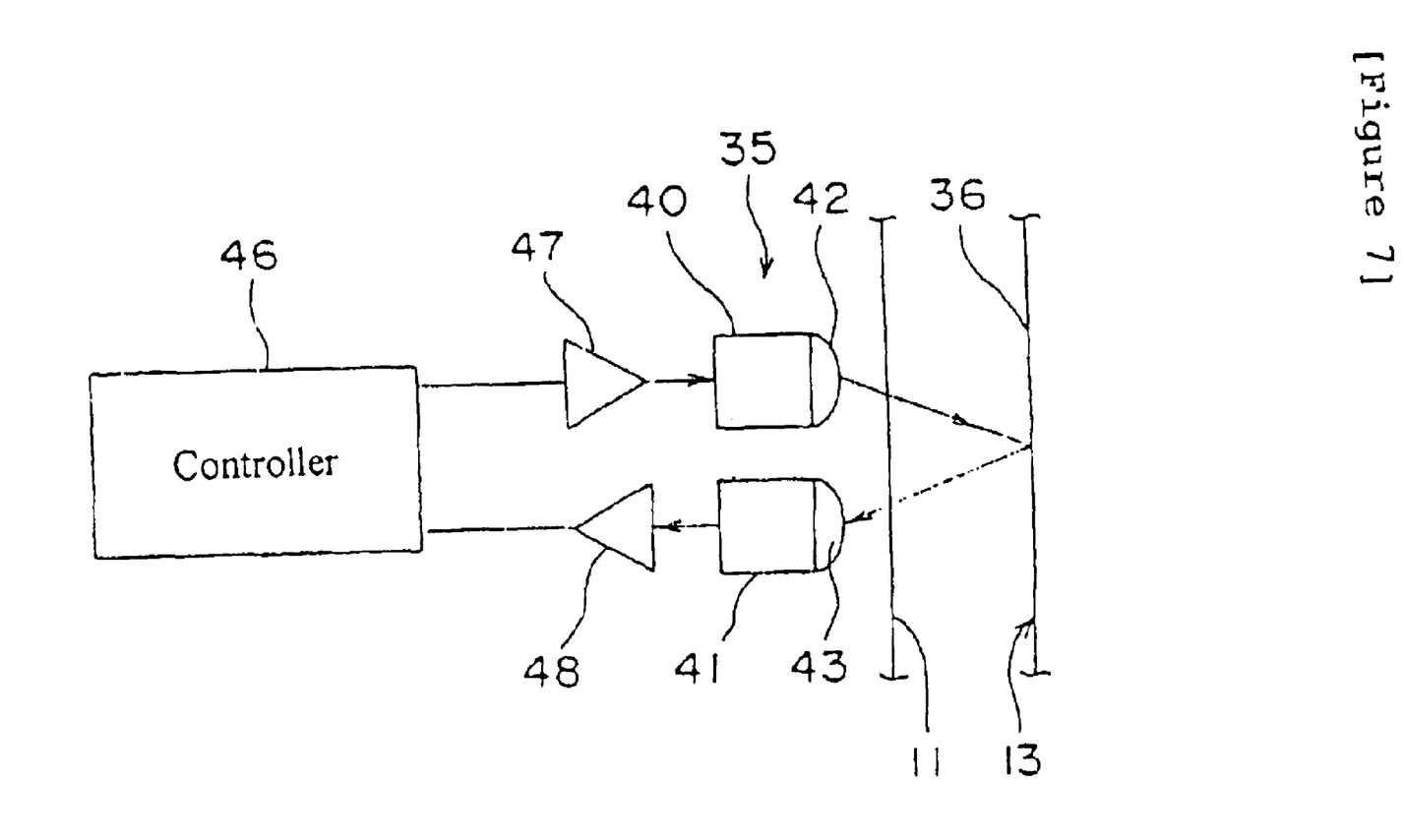
FIG. 7 is an electric circuit diagram of a detector including an optical sensor.

FIG. 7 shows an electric circuit diagram of a detector including the optical sensor 35. The optical sensor 35 includes the infrared radiator 40 and the infrared-ray detector 41. The infrared radiator 40 and the infrared-ray detector 41 are equipped at their light emergence ends with lenses 42 and 43, respectively. A controller 46 supplies driving current to the infrared radiator 40 through a driver 47, and receives current output from the infrared-ray detector 41, through a receiver 48. If the flexible reflection member 36 goes to a predetermined position with respect to the optical sensor 35, i.e., the third superposed state C3 of the computer main body thickness portion 11 and digitizer thickness portion 12, the flexible reflection member 36 is moved close to the optical sensor 35 and goes to a position where it reflects the light from the infrared radiator 40 toward the infrared-ray detector 41. As a result, the light from the infrared radiator 40 is incident on the infrared-ray detector 41. The controller 46 monitors the input from the receiver 48 and when the light from the infrared radiator 40 is incident on the infrared-ray detector 41 judges that the portable computer 10 has gone to the third superposed state C3 of the computer main body thickness portion 11 and digitizer thickness portion 12. To prevent the infrared-ray detector 41 from making an erroneous detection because of noise such as external light, etc., the lenses 42 and 43 are formed into a predetermined shape so that they have a predetermined directivity with respect to the light emitted from the infrared radiator 40 and the incident light detected by the infrared-ray detector 41. In addition, the distance between the computer main body thickness portion 11 and the digitizer thickness portion 12, on which the judgement of the third superposed state C3 is based, can be varied by varying the output of the infrared radiator 40, the reflection coefficient of the flexible reflection member 36, and the detecting sensitivity of the infrared-ray detector 41.

Figure 8:
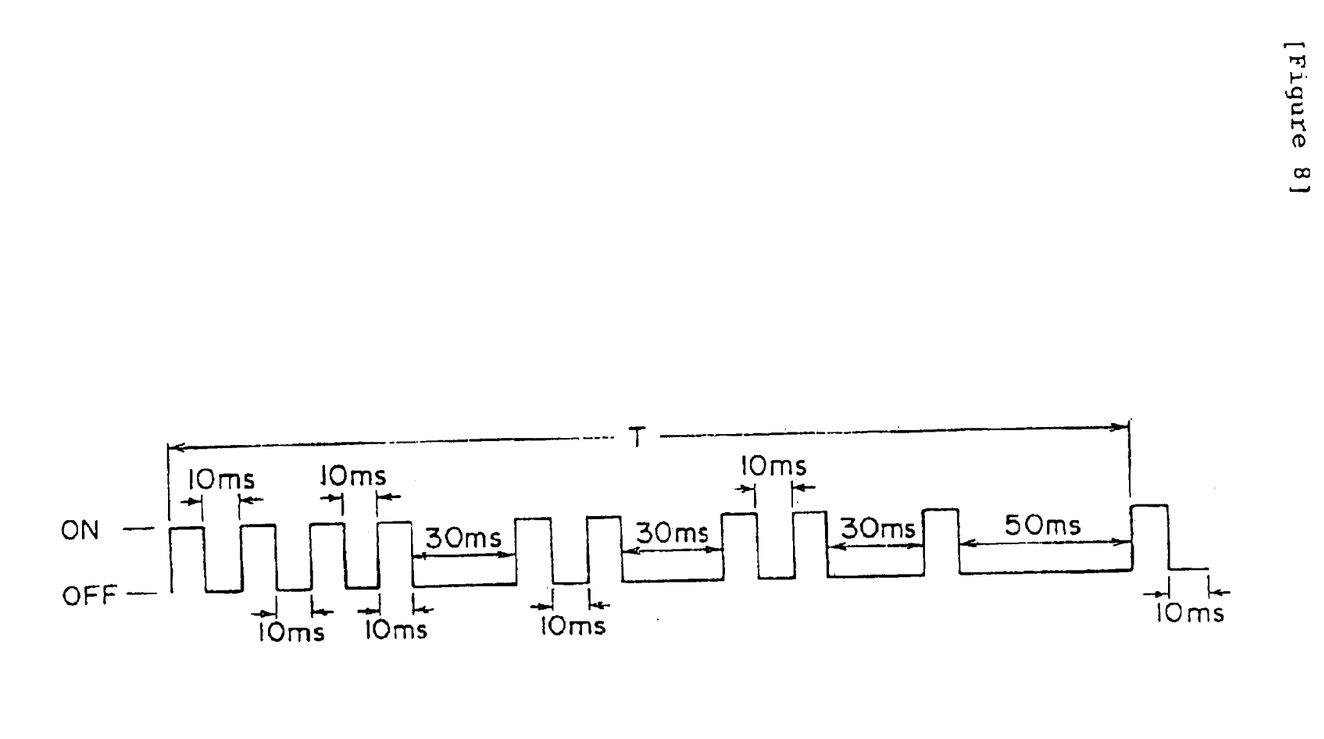
FIG. 8 is a diagram showing the blinking pattern of light emitted from the lens shown in FIG. 7.

FIG. 8 shows the blinking pattern of the light emitted from the lens 42 shown in FIG. 7. As external light is also incident on the infrared-ray detector 41, there are cases where an erroneous detection of the third superposed state C3 will be made due to the external light incident on the infrared-ray detector 41. To prevent this erroneous detection, the light emitted from the infrared radiator 40 is specified to a blinking pattern such as that shown in FIG. 8. Thus, when light with the same blinking pattern as that shown in FIG. 8 is incident on the infrared-ray detector 41, it is judged that it is the light, emitted from the infrared radiator 40, and reflected at the flexible reflection member 36, and it is judged that the computer main body thickness portion 11 and the digitizer thickness portion 12 have gone to the third superposed state C3.

Figure 9:
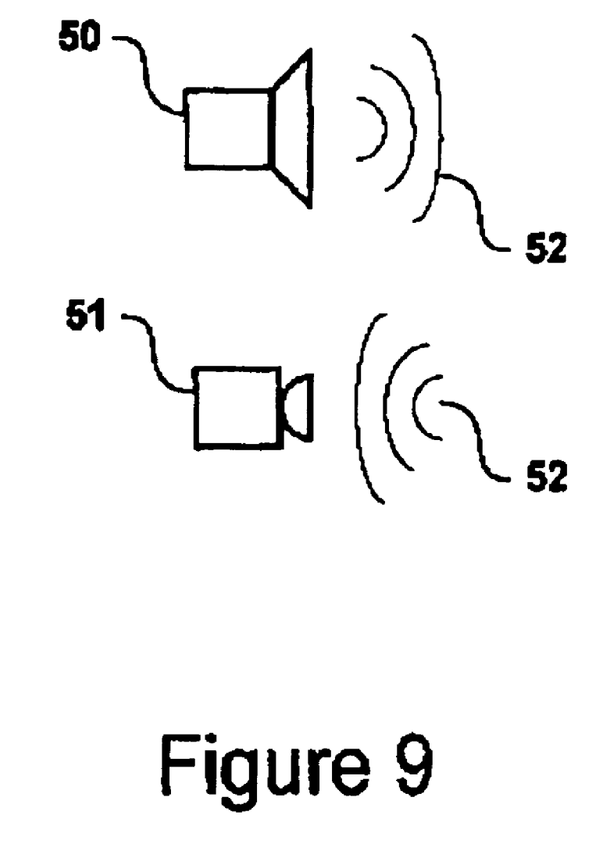
FIG. 9 is a diagram showing a supersonic wave transmitter and receiver which, in one embodiment, detect the superposed state.

FIG. 9 is a shows a supersonic wave transmitter 50 and receiver 51 for use in one embodiment in detecting the superposed state. Instead of light, the superposed state of the first and second stacked portions can be accurately detected by supersonic waves. As in other embodiments, the supersonic wave transmitter 50 and supersonic wave receiver 51 can be provided in one of the first and second stacked portions of the information processing apparatus, which first and second portions are held together by the deformable member as described above. The supersonic wave receiver 51 receives supersonic waves 52 that are transmitted from the supersonic wave transmitter 50. The supersonic waves 52 are reflected by the other portion or by the deformable member when the first and second portions are disposed in a superposed state. Because supersonic waves 52 are reflected by the other of the first and second stacked portions, or by the deformable member, addition of the reflection member provided in the case of light can be omitted. Alternatively, the reflection member provided in the case of light may be included. The processing of the supersonic waves 52 can be performed by a processor similar to the controller 46 shown In FIG. 7.

What is claimed is:

1. A portable information processor comprising:
    first and second portions superposable in stacked form relative to each other;
    a deformable member connecting said first and second portions so as to allow said first and second portions to be superposed in said stacked form;
    a light-emitting device and a photodetector provided in said second portion;
    a light reflective member, provided in said deformable member, for reflecting light emitted from said light-emitting device toward said photodetector when said first and second portions are disposed in a predetermined superposed state; and
    a processor which determines, based on incidence of said emitted light on said photodetector, whether or not said first and second portions are in the superposed state, and which carries out a predetermined process on a determination that said first and second portions are in the superposed state;
    wherein said first portion includes an upper surface and a lower surface, and the superposed state of said first and second portions includes a first superposed state, in which an upper surface of said first portion is disposed against a side of said second portion, end a second superposed state, in which a lower surface of said first portion is disposed against the side of said second portion, and
    wherein said deformable member allows both said first and second superposed states by deformation thereof and is connected at its lower surface to said first portion; in said first superposed state, said deformable member is present between said first and second portions.

2. The portable information processor according to claim 1, wherein said deformable member is constructed of a flexible member which is deformable by flexion thereof.

3. The portable information processor according to claim 2, wherein said light reflective member is constructed of a flexible light reflective member rigidly attached to said flexible member.

4. The portable information processor according to claim 2, wherein said flexible member is also used as said light reflective member.

5. A portable information processor comprising:
    first and second portions superposable in stacked form relative to one another;
    a deformable member connecting said first and second portions, deformable so as to allow said first and second portions to be superposed and to be separated in a predetermined range;
    a supersonic wave transmitter provided in one of said first and second portions;
    a supersonic wave receiver, provided in one of said first and second portions, for receiving supersonic waves, transmitted from said supersonic wave transmitter, and reflected by the other portion or deformable member when said first and second portions are disposed in a superposed state; and
    a processing unit for determining, based on the reception of said supersonic waves at said supersonic wave receiver, whether or not said first and second portions are in the superposed state, and carrying out a predetermined process when judging said first and second portions to be in the superposed state.

6. Apparatus comprising:
    first and second portions each having a base surface and an operable surface;
    a deformable member connecting said first and second portions so as to allow said first and second portions to be superposed in at least two stacked states including a first stacked state wherein the operable surface of said first portion faces the operable surface of said second portion and a second stacked state wherein the base surface of said first portion faces the operable surface of said second portion;

a detector which detects at least one of the stacked states and generates a signal indicative of the stacked state; and a processor which carries out a predetermined process based upon the signal indicative of the stacked state;

wherein said deformable member connecting said first and second portions further allows said first and second portions to be superposed in at least a third stacked state wherein the operating surface of said first portion faces the base surface of said second portion.

7. Apparatus of claim 6 wherein said detector is a light emitting device and a photodetector provided in one of said first and second portions and wherein the apparatus further comprises:

a reflective member which reflects light emitted from the light-emitting device toward the photodetector when said first and second portions are disposed in a predetermined superposed state, wherein said reflective light member is provided in a unit selected from the group consisting of the other of said first and second portions and said deformable member.

8. Apparatus of claim 7 wherein the light reflective member is provided in said deformable member and the light-emitting device and the photodetector are disposed in said second portion.

9. Apparatus of claim 6 wherein the detector comprises:

a light-emitting device provided in one of said first and second portions; and a photodetector which receives light emitted from the light-emitting device when said first and second portions are arranged in the stacked state;

wherein the photodetector provided in a unit is selected from the group consisting of the other of said first and second portions and said deformable member.

10. Apparatus of claim 6 wherein the detector comprises:

a supersonic wave transmitter provided in one of said first and second portions; and a supersonic wave receiver, provided in one of said first and second portions, which receives supersonic waves transmitted from said supersonic wave transmitter and reflected by a reflective unit when said first and second portions are disposed in a superposed state;

wherein the reflective unit is selected from the group consisting of the other of said first and second portions and said deformable member.

11. Apparatus of claim 6, wherein said first portion is a digitizer.

12. Apparatus of claim 11, wherein said second portion is a liquid crystal display having a back light and the predetermined process performed by said processor is to turn off the back light when the stacked state indicated by said detector is the state in which the base surface of said digitizer is superposed on the operating surface of said liquid crystal display with a back light.

13. Apparatus of claim 11, wherein said second portion is a touch panel and the predetermined process performed by said processor is to cause the touch panel to be in a non-operative state when the stacked state indicated by said detector is the state in which the base surface of said digitizer is superposed on the operating surface of the touch panel.

* * * * *